US010266671B2

(12) United States Patent
Watson et al.

(10) Patent No.: US 10,266,671 B2
(45) Date of Patent: Apr. 23, 2019

(54) TUBE MADE OF A HETEROPHASIC POLYPROPYLENE COMPOSITION

(71) Applicant: BOREALIS AG, Vienna (AT)

(72) Inventors: Ann Watson, Arbroath (GB); Bill Fajardo, Ridgewood, NJ (US); Ted Gormanos, Marietta, GA (US); Markus Gahleitner, Neuhofen/Krems (AT); Jingbo Wang, Engerwitzdorf (AT); Hermann Braun, Linz (AT); Fredrik Bergfors, Göteborg (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/741,661

(22) PCT Filed: Jul. 7, 2016

(86) PCT No.: PCT/EP2016/066087
§ 371 (c)(1),
(2) Date: Jan. 3, 2018

(87) PCT Pub. No.: WO2017/005837
PCT Pub. Date: Jan. 12, 2017

(65) Prior Publication Data
US 2018/0201756 A1 Jul. 19, 2018

(30) Foreign Application Priority Data
Jul. 8, 2015 (EP) .................... 15175780

(51) Int. Cl.
C08K 3/34 (2006.01)
C08K 5/105 (2006.01)
C08K 5/3492 (2006.01)
G02B 6/44 (2006.01)
C08L 23/12 (2006.01)

(52) U.S. Cl.
CPC ............... C08K 5/105 (2013.01); C08K 3/34 (2013.01); C08K 5/34926 (2013.01); C08L 23/12 (2013.01); G02B 6/443 (2013.01); C08L 2205/025 (2013.01); C08L 2207/02 (2013.01); C08L 2308/00 (2013.01); C08L 2314/02 (2013.01); G02B 6/441 (2013.01)

(58) Field of Classification Search
CPC .. C08L 2207/02; C08L 2308/00; C08L 23/12; C02B 6/44; C02B 6/4401; C02B 6/4429; C02B 6/443; C08F 297/083; H01B 7/295
USPC ........... 428/36.9, 36.91, 36.92; 385/100–114
See application file for complete search history.

(56) References Cited

U.S. PATENT DOCUMENTS

| 4,837,259 A | 6/1989 | Chucta |
| 2005/0085574 A1 | 4/2005 | Gijsman et al. |
| 2005/0288403 A1 | 12/2005 | de la Cruz et al. |
| 2013/0005902 A1* | 1/2013 | Doshev .................. C08F 10/06 525/53 |
| 2013/0309431 A1* | 11/2013 | Bergstra .................. C08L 23/10 428/36.9 |

FOREIGN PATENT DOCUMENTS

| EP | 0 491 566 | 6/1992 |
| EP | 0 887 379 | 6/1998 |
| EP | 1 024 382 | 1/2000 |
| EP | 1030876 | 4/2002 |
| EP | 2 154 194 | 1/2008 |
| EP | 2072546 | 6/2009 |
| EP | 2075284 | 7/2009 |
| EP | 2368938 A1 * | 9/2011 ............ C08F 210/06 |
| EP | 2 610 271 | 12/2011 |
| EP | 2 610 272 | 12/2011 |
| EP | 2 610 270 | 7/2013 |
| EP | 14190440.9 | 10/2014 |
| EP | 2 886 599 | 6/2015 |
| WO | 92/12182 | 12/1991 |
| WO | 92/19653 | 11/1992 |
| WO | 92/19658 | 11/1992 |
| WO | 99/24478 | 5/1999 |
| WO | 99/24479 | 11/1999 |
| WO | 00/68315 | 5/2000 |
| WO | 2004/000899 | 6/2002 |
| WO | 03/046074 | 6/2003 |
| WO | 2004/111095 | 12/2004 |
| WO | 2012/007430 | 1/2012 |
| WO | WO-2014161621 A1 * | 10/2014 ............. C08L 23/12 |
| WO | 2016066453 | 5/2016 |

OTHER PUBLICATIONS

Busico, et al., "Microstructure of polypropylene," Progress in Polymer Science, 2001, vol. 26 pp. 443-533, Elsevier Science Ltd.

(Continued)

Primary Examiner — Lee E Sanderson
(74) Attorney, Agent, or Firm — Lowenstein Sandler LLP

(57) ABSTRACT

The invention relates to a tube comprising a heterophasic polypropylene composition comprising a heterophasic polypropylene copolymer with an antioxidant comprising a sterically hindered phenol. The heterophasic polypropylene copolymer has the relative amount of crystal line polypropylene above 20 wt %. the relative amount of xylene cold solubles (XCS) fraction is at least 10 wt % and the relative content of isolated ethylene sequences (I(E)) of the XCS fulfills the equation: $I(E) < 78 - 1.97 \times C + 0.015 \times (C)^2$ wherein C is the comonomer content [wt %] of the XCS fraction and wherein the I(E) content is defined by equation I(E) wherein I(E) is the relative content of isolated to block ethylene sequences.

$$I(E) = \frac{fPEP}{(fEEE + fPEE + fPEP)} \times 100$$

15 Claims, No Drawings

(56) References Cited

OTHER PUBLICATIONS

Busico, et al., "Alk-1-ene Polymerization in the Presence of a Monocyclopentadienyl Zirconium(iv) Acetamidinate Catalyst: Microstructural and Mechanistic Insightsa," Macromolecular Journals, 2007, vol. 28, pp. 1128-1134, Wiley-VCH Verlag GmbH & Co. KGaA, Weinheim.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Cheng, H.N., "13C NMR Analysis of Ethylene-Propylene Rubbers," Macromolecules, 1984, vol. 17, No. 10, pp. 1950-1955, American Chemical Society.
European Search Report for Application No. 15179158.9-1302 dated Apr. 2, 2016, 5 pgs.
International Search Report and The Written Opinion of the International Searching Authority, Or the Declaration for Application No. PCT/EP2016/066087, dated Sep. 7, 2016, 10 pgs.
Resconi, et al., "Selectivity in Propene Polymerization with Metallocene Catalysts," Chemical Reviews, 2000, vol. 100, pp. 1253-1345, American Chemical Society.
Wang, et al., "Structural Analysis of Ethylene/Propylene Copolymers Synthesized with a Constrained Geometry Catalyst," Macromolecules, 2000, vol. 33, pp. 1157-1162, American Chemical Society.
Wang, et al., "Polypropylene/Linear Low-Denisty Polyethylene Blends: Morphology, Crystal Structure, Optical, and Mechanical Properties," Journal of Applied Polymer Science, 2009, vol. 111, pp. 194-202, Wiley Periodicals, Inc.
Zhou, et al., "A new decoupling method for accurate quantification of polyethylene copolymer composition and triad sequence distribution with 13C NMR," Journal of Magnetic Resonance, 2007, vol. 187, pp. 225-233, Elsevier.
Kakugo, et al., "C NMR Determination of Monomer Sequence Distribution in Ethylene-Propylene Copolymers Prepared with s-TiCL13-AL (C2H5)2Cl," Macromolecules, vol. 15, 1982, pp. 1150-1152, American Chemical Society.
Hans Zweifel "Stabilization of Polymeric Materials, Principles of Stabilization", Chapter 2, Springer-Verlag Berlin Heidelberg Publishers, 1998, pp. 43-47.
Australian Examination Report No. 1 for Application No. 2016289488 dated Jun. 4, 2018, 7 pages.
Singh, et al., "Triad sequence determination of ethylene-propylene copolymers—application of quantitative 13C NMR," Polymer Testing 2009, pp. 475-479, vol. 28, Elsevier Ltd.
Notice of Opposition to a European Patent for Patent Application No. 15175780.4 dated Mar. 14, 2018, 25 pages.
English translation of the Office Action issued by the Eurasian Patent Office dated Dec. 18, 2018 for Application No. 201800066/28, 3 pages.

* cited by examiner

TUBE MADE OF A HETEROPHASIC POLYPROPYLENE COMPOSITION

CROSS-REFERENCE TO RELATED APPLICATION(S)

This application is a national phase of International Application No. PCT/EP2016/066087, filed on Jul. 7, 2016, which claims the benefit of European Patent Application No. 15175780.4, filed on Jul. 8, 2015. The contents of these applications are hereby incorporated by reference in their entirety.

FIELD OF THE INVENTION

The present invention relates to a tube made of a heterophasic polypropylene composition that can be used as a buffer tube for protecting a number of single optical fibres in a fibre optic cable. The tube has a good stiffness in combination with low shrinkage.

BACKGROUND

Polymers, like polypropylene, are increasingly used in different demanding applications. At the same time there is a continuous search for tailored polymers which meet the requirements of these applications. The demands can be challenging, since many polymer properties are directly or indirectly interrelated, i.e. improving a specific property can only be accomplished on the expense of another property. Stiffness can for instance be improved by increasing the crystallinity and/or the relative amount of homopolymer within the composition. As a consequence, the material becomes more brittle, thereby resulting in poor impact properties. Moreover, the shrinkage of moulded or extruded articles increases with increase crystallinity. It is known that impact strength of polypropylene can be improved by dispersing a rubber phase within the polymer matrix, thereby obtaining a heterophasic polypropylene composition.

Such heterophasic propylene copolymers comprise a matrix being either a propylene homopolymer or a random propylene copolymer in which an amorphous phase, which contains a propylene copolymer rubber (elastomer), is dispersed. Thus the polypropylene matrix contains (finely) dispersed inclusions not being part of the matrix and said inclusions contain the elastomer. The term inclusion indicates that the matrix and the inclusion form different phases within the heterophasic propylene copolymer, said inclusions are for instance visible by high resolution microscopy, like electron microscopy or scanning force microscopy or atomic force microscopy, or by dynamic mechanical thermal analysis (DMTA). Further the heterophasic polypropylene may contain to some extent a crystalline polyethylene, which is a by-reaction product obtained by the preparation of the heterophasic propylene copolymer. Such crystalline polyethylene is present as inclusion of the amorphous phase due to thermodynamic reasons.

One suitable application of such heterophasic polypropylene compositions is its use in tubes such as the field of transmission elements, in particular coated optical fibres, used in telecommunication cables which are typically protected, either individually or as a group, by buffer tubes.

For instance, one or more optical fibres, a group, bundle or ribbon of optical fibres may be protected by a polymeric material in the form of a tube or of a flexible sheath, i.e. the buffertube. The optical fibre together with its protective element is generally referred to in the art as "optical unit".

An optical cable may contain a single optical unit or a plurality of optical units. Said single or plurality of optical units is generally referred to as the optical core of the cable. The optical core is in turn typically inserted into a protecting polymeric jacket. Such a construction is referred to as optical fibre cable.

EP patent application no. 1 024 382 discloses a telecommunication cable comprising a flexible buffer tube made from a thermoplastic polyolefin elastomer having a modulus of elasticity below 500 MPa at room temperature and a modulus of elasticity below 1500 MPa at −40° C. Examples of suitable elastomers are ethylene-propylene copolymers, preferably with more than 10 percent of ethylene monomer, terpolymers containing propylene-ethylene, ultra-low density polyethylene or ethylene-octene copolymers, preferably containing more than 10% by weight of octene monomer. The elastomer can also contain inorganic fillers for controlling physical parameters, such as mechanical properties and flame retardancy.

EP 1 448 705 discloses a heterophasic olefin copolymer having at least one amorphous phase and at least two different crystalline phases. This makes it possible to manufacture tubular elements for telecommunication cables which have improved tearableness. The extrusion will be complicated.

One disadvantage of polypropylene resins is that in most extrusion processes they are subject to significant post-extrusion shrinkage. This means that in applications where shrinkage resp. dimensional stability is important the extrusion parameters must be tailored to the specific composition and the specific extrusion operation to yield a finished part of the precise dimension which is required. This shrinkage problem is particularly troublesome where the manufacturer has several extrusion dimensions and extrusion operations and subsequently wishes to substitute a different composition or halter the process to e.g. increase the cooling rate. This problem is enhanced because polypropylene resins show a post-moulding shrinkage difference in the longitudinal and the transverse direction with respect to the flow direction in processing.

Although a lot of development work has been done in the field of heterophasic polypropylene compositions, it was up to now not possible to find a well-balanced polymer composition with respect to a good balance between stiffness and impact strength in combination with low shrinkage.

Along the present description and claims, the term "tube" is intended to include within its meaning any element which has or can be disposed in a tubular form, especially within the cable structure. Examples of such tubular elements are buffer tubes housing at least one transmission element or polymeric sheaths disposed to surround inner portions of a telecommunication cable, e.g. one or more buffer tubes. Said polymeric sheath is preferably in the form of a tube (e.g. extruded about said inner portion).

SUMMARY OF THE INVENTION

The present invention relates to an extruded tube comprising a heterophasic polypropylene composition comprising
(a) a heterophasic polypropylene copolymer
(b) an antioxidant comprising an sterically hindered phenol wherein the heterophasic polypropylene copolymer fulfil the following features:
(i) the relative amount of crystalline PP in the heterophasic polypropylene copolymer is above 20 wt %, (ii) the relative amount of xylene cold solubles (XCS) fraction in said heterophasic polypropylene copolymer is at least 10 wt %
(iii) the relative content of isolated ethylene sequences (I(E)) of the XCS fulfills the equation:

$$I(E) < 78 - 1.97 \times C + 0.015 \times (C)^2 \quad (I)$$

wherein C is the comonomer content [wt %] of the XCS fraction and wherein the I(E) content is defined by equation:

$$I(E) = \frac{fPEP}{(fEEE + fPEE + fPEP)} \times 100 \quad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

The I(E) content, which can also be called normalized PEP value (nPEP), has to fulfill the equation (I):

$$I(E) < 78 - 1.97 \times C + 0.015 \times (C)^2$$

wherein C is the comonomer content, preferably the ethylene content, [wt %] of the XCS fraction.

Such kind of composition is suitable for extrusion of tubes, such as buffer tubes, with good stiffness impact balance and low shrinkage.

The inventive compositions are based on heterophasic copolymers showing an improved toughness/shrinkage balance and good oxidation induction time (OIT) by using the inventive heterophasic polypropylene composition. Other features like the Notched impact strength at −20° C. are also further improved.

The heterophasic polypropylene composition is suitable for extrusion of hollow components, such as tubes with good stiffness/impact balance and low shrinkage.

Sterically hindered phenol means that the phenol is stearic hindered by substituents, e.g. tert-butyl groups in the 2- and 6-position. This is further described in the book; Stabilization of Polymeric Materials, Hans Zweifel, Springer, 1977, see chapter 2.1.2.1, pages 43-47.

Typical examples of sterically hindered phenol components suitable as antioxidants in the sense of the present inventions include Pentaerythrityl-tetrakis(3-(3',5'-di-tert. butyl-4-hydroxyphenyl)-propionate (CAS-no. 6683-19-8), Octadecyl 3-(3',5'-di-tert. butyl-4-hydroxyphenyl)propionate (CAS-no. 2082-79-3), 1,3,5-Tris(3',5'-di-tert. butyl-4'-hydroxybenzyl)-isocyanurate (CAS-no. 27676-62-6).

The amount of antioxidant comprising a sterically hindered phenol is suitably 0.1 to 2.0 wt % of the heterophasic polypropylene composition, suitably 0.2 to 1.0 wt %.

DETAILED DESCRIPTION

The heterophasic polypropylene copolymer can have a total comonomer content defined as the sum of content of ethylene and α-olefins with 4-10 carbon atoms in the range of 7 to 26 wt %, suitably 7 to 20 wt %, more suitably 8 to 15 wt %, even more suitably 8 to 12 wt %. Suitably is the total ethylene content in the range of 7 to 26 wt %, suitably 7 to 20 wt %, more suitably 8 to 15 wt %, even more suitably 8 to 12 wt %.

The relative amount of crystalline PP in the heterophasic polypropylene copolymer is suitably above 25 wt %, more suitably above 30 wt %. Further is the amount of crystalline PP in the heterophasic polypropylene copolymer is suitably less than 45 wt %, more suitably less than 40 wt %.

In one embodiment of the invention the heterophasic polypropylene copolymer has an ethylene content of the XCS fraction of 32 to 70 wt %, suitably 33 to 60 wt % and more suitably 35 to 50 wt %.

In a suitable embodiment the heterophasic polypropylene copolymer is characterized by an intrinsic viscosity of the XCS fraction in the range of 1.5 to 7.0 dl/g, suitably 2.0 to 5.0 dl/g, more suitably 2.5 to 5.0 dl/g.

In a further embodiment the heterophasic polypropylene copolymer will fulfil the following features:
(iii) 90-70 wt % of xylene cold insoluble (XCI) fraction having an ethylene content in the range of 1.0 to 10.0 wt % and a relative content of isolated ethylene sequences (I(E)) of less than 20%, and
(iv) 30-10 wt % of xylene cold soluble (XCS) XS with C2 of XCS from fraction having an ethylene content in the range of 30 to 60 wt % and a relative content of isolated ethylene sequences (I(E)) of less 45%.

In a more suitable embodiment the heterophasic polypropylene copolymer has the following features:
(v) a crystalline polypropylene content with a melting point (Tm) from DSC analysis according ISO 11357 in the range of 160 to 170° C. and
(vi) optionally a crystalline polyethylene content with a melting point from DSC analysis according ISO 11357 in the range of 105 to 130° C.

Even more suitably, the heterophasic polypropylene copolymer has a detectable crystalline polyethylene content which fulfils the equation Hm-PE/Hm-PP<5. This means that the PE fraction in the heterophasic polypropylene copolymer has crystalline fraction. This is measured as Hm-PE and is suitably lower than 2.0 kJ/mg, suitably lower than 1.0 kJ/mg, more suitably 0.8 kJ/mg.

In one embodiment the heterophasic polypropylene copolymer is in an amount of 50 to 99 wt % of the heterophasic polypropylene composition, suitably 75 to 98 wt %.

In one embodiment the heterophasic polypropylene composition has a MFR$_2$ of 1.0 to 10 g/10 min measured at 230° C., suitably 2.0 to 6.0 g/10 min. The MFR$_2$ shall be well balanced for the application. Low MFR$_2$ will improve the mechanical properties, while impairing extrusion output. These two properties need to be balanced against each other.

In one embodiment the heterophasic polypropylene composition comprises an amount of 0.1 to 3.0 wt % of reinforcing filler, suitably talc. The amount of talc should not be too much. The amount of talc should be selected in order not to have any obvious further nucleating effect. This can be observed as more or less no change in Tc-PP. The change in Tc-PP from a heterophasic polypropylene composition with and without talc should be less than 5.0° C., suitably less than 3.0° C. The talc has the surprising effect of improving the OIT at 210° C. It further has the effect of reducing shrinkage. In one embedment of the invention is no nucleating agent added into the heterophasic polypropylene composition.

A reinforcing filler increases the thermo-mechanical properties of the polymer, especially the stiffness and heat resistance, resulting e.g. in a higher heat distortion temperature.

The heterophasic polypropylene composition can further comprise an amount of 0.1 to 10 wt % of further additives and/or fillers, suitably 0.2 to 2.0 wt %.

As to optional additives, the polymer composition of the invention suitably contains conventional additives for tube applications, such as buffertubes, including without limiting to, antioxidants, UV light stabilisers, absorbers, clarifiers, brighteners, acid scavengers, processing agents as well as slip agents, suitably one or more additives selected at least from a group of antioxidants, UV light stabilisers, clarifiers, brighteners, acid scavengers, processing agents and slip agents. The additives can be used in conventional amounts.

In a more suitable embodiment the heterophasic polypropylene composition has a further antioxidant comprising at least one an amine group. This further antioxidant is suitably an UV additive, such as stabilizers and/or absorbers. The further additive suitably comprises an amine group, examples of such are Poly((6-((1,1,3,3-tetramethylbutyl) amino)-1,3,5-triazine-2,4-diyl)(2,2,6,6-tetramethyl-4-piperidyl)imino)-1,6-hexanediyl((2,2,6,6-tetramethyl-4-piperidyl)imino)) (CAS no 71878-19-8), 2-hydroxy-4-n-octoxybenzophenone (CAS-no. 1843-05-6), 2,4-di-t-butylphenyl-3,5-di-t-butyl-4-hydroxybenzoate (CAS-no. 4221-80-1), n-Hexadecyl-3,5-di-t-butyl-4-hydroxybenzoate (67845-93-6), Poly[2-hydroxy-4-(acryloyloxyethoxy)benzophenone] (CAS-no. 29963-76-6), 2-(3',5'-di-t-butyl-2'-hydroxyphenyl)-5-chlorobenzotriazole (CAS-no. 3864-99-1), 2-(3'-t-butyl-5'-methyl-2'-hydroxyphenyl)-5-chlorobenzotriazole (CAS-no. 3896-11-5), 2-(3',5'-di-1,1-dimethylpropyl-2'-hydroxyphenyl)-benzotriazole (CAS-no. 25973-55-1), 2-(2'-Hydroxy-5'-t-octylphenyl) benzotriazole (CAS-no. 3147-75-9), 2-(2'-Hydroxy-5'-methylphenyl) benzotriazole (CAS-no. 2440-22-4), 2,2'-methylenebis(6-(2H-benzotriazole-2-yl)4-1,1,3,3-tetramethylbutyl)phenol) (CAS-no. 103597-45-1), 2-(2-Hydroxy-3,5-di-($\alpha,\alpha$-dimethylbenzyl)phenyl)-2H-benzotriazole (CAS-no. 70321-86-7), 2-(4,6-Diphenyl-1,3,5-triazin-2-yl)-5-((hexyl)oxy)-phenol (CAS-no. 147315-50-2), 2-(2'-Hydroxy-3',5'-di-t-butylphenyl)benzotriazole (CAS-no. 3846-71-7), 2-Ethyl, 2'-ethoxy-oxalanilide (CAS-no. 23949-66-8), 2-[4,6-Bis(2,4-dimethylphenyl)-1,3,5-triazin-2-yl]-5-(octyloxy) phenol (CAS-no. 2725-22-6), Pentaerythritol tetrakis (2-cyano-3,3-diphenylacrylate) (CAS-no. 178671-58-4), Bis-(2,2,6,6-tetramethyl-4-piperidyl)-sebacate (CAS-no. 52829-07-9), Bis-(1,2,2,6,6-pentamethyl-4-piperidyl) sebacate (CAS-no. 41556-26-7), Propanedioic acid, ((4-methoxyphenyl)-methylene), bis(1,2,2,6,6-pentamethyl-4-piperidinyl)ester (CAS-no. 147783-69-5), N,N'-bis(2,2,6,6-tetramethyl-4-piperidyl)-N,N'-hexamethylenebis(formamide) (CAS-no. 124172-53-8), Dimethyl succinate polymer with 4-hydroxy-2,2,6,6-tetramethyl-1-piperidine ethanol (CAS-no. 65447-77-0), Bis-(1-octyloxy-2,2,6,6-tetramethyl-4-piperidinyl) sebacate (CAS-no. 129757-67-1) and Bis(1,2,2,6,6-pentamethyl-4-piperidinyl)(3,5-bis (1,1-dimethylethyl)-4-hydroxyphenyl methyl) butylpropandioate (CAS-no. 63843-89-0). Most suitably the further antioxidant comprises at least one an amine group comprising a tertiary amine group.

In an even more suitable embodiment the heterophasic polypropylene composition comprises a metal deactivator and/or UV stabilizer/absorber, most suitable a combination of a metal deactivator and an UV stabilizer/absorber.

One embodiment of the invention is an extruded tube, suitably a buffer tube. Suitably the buffer tube is used for a fibre optical cable. Said optical fibre cable comprises at least one buffer tube, suitably several buffer tubes.

Preparation of the Heterophasic Polypropylene Copolymer

The heterophasic polypropylene copolymer is produced in a multistage process comprising at least three reactors connected in series, wherein the polypropylene homopolymer matrix (A) is produced first and in a subsequent step the propylene copolymer (B) is produced in the presence of the matrix (A).

A further possibility to prepare the heterophasic polypropylene copolymer of the present invention is blending a heterophasic polypropylene copolymer produced in a multistage process comprising at least three reactors connected in series, wherein the polypropylene homopolymer matrix (A) is produced first and in a subsequent step the propylene copolymer (B) is produced in the presence of the matrix (A), with specific additional amounts of polypropylene homopolymer matrix (A) in order to achieve the targeted properties of the XCS fraction.

In one preferred embodiment the polypropylene homopolymer matrix (A) is produced in one slurry reactor and a subsequent gas phase reactor and afterwards the propylene copolymer (B) is produced in at least one further gas phase reactor.

Accordingly the heterophasic polypropylene composition of the instant invention can be typically produced in a cascade of at least 3 reactors with an optional $4^{th}$ reactor, where the first reactor is a liquid bulk reactor preferably of loop design and all subsequent reactors are gas phase reactors, preferably of fluidized bed design.

Preferably the components produced in the first two reactors are crystallisable propylene homopolymers (obtaining the matrix), while the component produced in the third reactor is a predominantly amorphous copolymer with higher amounts of comonomer. Optionally a further component can be produced in the fourth reactor, which is either also a predominantly amorphous copolymer or a crystalline ethylene homo- or copolymer.

In case the heterophasic polypropylene copolymer, is produced in three or four polymerization reactors (R1), (R2), (R3) and optional (R4), the matrix (A) of the polypropylene composition, i.e. the polypropylene homopolymer, is produced in the polymerization reactor (R1), like in the slurry reactor (SRO, e.g. in the loop reactor (LR1), and the polymerization reactor (R2), like in the gas phase reactor (GPR-1), whereas the predominantly amorphous copolymer (B) is produced in the polymerization reactor (R3), e.g. in the gas phase reactor (GPR-2) and in the optional polymerization reactor (R4), e.g. in the optional gas phase reactor (GPR-3).

It is preferred that
(a) in a first reactor propylene is polymerized obtaining a first propylene homopolymer fraction,
(b) transferring said first propylene homopolymer fraction in a second reactor,
(c) polymerizing in said second reactor in the presence of the first propylene homopolymer fraction further propylene obtaining a second propylene homopolymer fraction, said first propylene homopolymer fraction and said second propylene homopolymer fraction form the matrix (A),
(d) transferring said matrix (A) in a third reactor,
(e) polymerizing in said third reactor in the presence of the matrix (A) propylene and ethylene and/or C4 to C10 $\alpha$-olefin obtaining a predominantly amorphous propylene copolymer (B), said matrix (A) and said predominantly amorphous propylene copolymer (B) form the heterophasic polypropylene copolymer.

In a further preferred mode a third gas phase reactor is used, so that the process further comprises steps (f) transferring the composition obtained in step (e) to a fourth reactor and (g) polymerizing in said fourth reactor in the presence of the heterophasic polypropylene copolymer obtained in the fourth reactor fraction propylene and ethylene and/or C4 to C10 α-olefin obtaining a further predominantly amorphous propylene copolymer (B), said further predominantly amorphous propylene copolymer (B) together with the heterophasic polypropylene copolymer of step (e) form the final heterophasic polypropylene copolymer.

By using—as stated above—a loop reactor and at least one gas phase reactor in serial configuration and working at different conditions, a multimodal (e.g. bimodal) propylene homopolymer matrix (A) can be obtained.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor, the third and the optional fourth reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor are gas phase reactors. Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis (known as BORSTAR® technology) which is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic polypropylene copolymer as defined above the conditions for the first reactor, i.e. the slurry reactor, like a loop reactor, may be as follows:

the temperature is within the range of 50° C. to 110° C., preferably between 60° C. and 100° C., more preferably between 62 and 85° C., the pressure is within the range of 20 bar to 80 bar, preferably between 40 bar and 70 bar, hydrogen can be added for controlling the molar mass in a manner known per se.

Subsequently, the reaction mixture of the first reactor is transferred to the second reactor, i.e. gas phase reactor, where the conditions are preferably as follows:

the temperature is within the range of 50° C. to 130° C., preferably between 60° C. and 100° C., more preferably between 75 and 95° C., the pressure is within the range of 5 bar to 50 bar, preferably between 15 bar and 35 bar, hydrogen can be added for controlling the molar mass in a manner known per se.

The conditions in the third reactor and fourth reactor are similar to the second reactor. The residence time can vary in the three reactor zones.

In one embodiment of the process for producing the heterophasic polypropylene copolymer the residence time in bulk reactor, e.g. loop is in the range 0.1 to 3.5 hours, e.g. 0.15 to 3.0 hours and the residence time in gas phase reactor will generally be 0.2 to 6.0 hours, like 0.5 to 5.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization step with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene copolymer is obtained by a multistage polymerization process, as described above, in the presence of a catalyst system.

As pointed out above in the specific process for the preparation of the heterophasic polypropylene copolymer as defined above, a specific Ziegler-Natta catalyst must be used.

Accordingly, the Ziegler-Natta catalyst will be now described in more detail.

The catalyst used in the present invention is a solid Ziegler-Natta catalyst, which comprises compounds of a transition metal of Group 4 to 6 of IUPAC, like titanium, a Group 2 metal compound, like a magnesium, and an internal donor being preferably a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or MgCl2, but the catalyst is self-supported.

The Ziegler-Natta catalyst (ZN-C) can be further defined through the way by which it is obtained.

Accordingly, the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or $a_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or $a_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or $a_4$) providing a solution of Group 2 alkoxide of formula $M(OR_1)_n(OR_2)_mX_{2-n-m}$ or mixture of Group 2 alkoxides $M(OR_1)_nX_{2-n'}$ and $M(OR_2)_mX_{2-m'}$, where M is Group 2 metal, X is halogen, $R_1$ and $R_2$ are different alkyl groups of $C_2$ to $C_{16}$ carbon atoms, and $0 \le n < 2$, $0 \le m < 2$ and $n+m+(2-n-m)=2$, provided that both n and m≠0, $0 < n' \le 2$ and $0 < m' \le 2$; and b) adding said solution from step a) to at least one compound of a transition metal of Group 4 to 6 and c) obtaining the solid catalyst component particles, and adding an internal electron donor, preferably a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl$_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched C$_{12}$ to C$_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m$^2$, more preferably below 10 g/m$^2$. Typically the amount of Ti is 1 to 6 wt %, Mg 10 to 20 wt % and donor 10 to 40 wt % of the catalyst composition.

Detailed description of the preparation of suitable catalysts is disclosed in WO 2012/007430, EP 2 610 271, EP 2 610 27 and EP 2 610 272 which are incorporated here by reference.

The Ziegler-Natta catalyst is preferably used in association with an alkyl aluminum cocatalyst and optional external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general for Hula

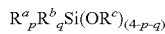

wherein R$^a$, R$^b$ and R$^c$ denote a hydrocarbon radical, in particular an alkyl or cycloalkyl group, and wherein p and q are numbers ranging from 0 to 3 with their sum p+q being equal to or less than 3. R$^a$, R$^b$ and R$^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of General formula

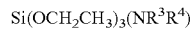

wherein R$^3$ and R$^4$ can be the same or different a represent a hydrocarbon group having 1 to 12 carbon atoms.

R$^3$ and R$^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^3$ and R$^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^1$ and R$^2$ are the same, yet more preferably both R$^3$ and R$^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene copolymer according to this invention is preferably produced in the presence of (a) a Ziegler-Natta catalyst comprising compounds (TC) of a transition metal of Group 4 to 6 of IUPAC, a Group 2 metal compound and an internal donor, wherein said internal donor is a non-phthalic compound, preferably is a non-phthalic acid ester and still more preferably is a diester of non-phthalic dicarboxylic acids;

(b) optionally a co-catalyst (Co), and (c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

In case the heterophasic polypropylene copolymer is prepared by compounding of the fractions defined above, any additives may be added together or after said compounding step.

Preferably, these additives are mixed into the composition prior to or during the extrusion process in a one-step compounding process. Alternatively, a master batch may be formulated, wherein the heterophasic polypropylene copolymer is first mixed with only some of the additives.

For mixing, a conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating. Preferably, the composition will be prepared by blending the additives together with the polymeric material at a temperature, which is sufficiently high to soften and plasticize the polymer. The temperatures and pressures used in the operation of the extruder are known in the art. Typically the temperature may be selected from the range of 150 to 350° C. The pressure used for extrusion preferably is 50 to 500 bar. The polymer materials recovered from the extruder are usually in the form of pellets. These pellets are then preferably further processed, e.g. by injection moulding to generate articles and products of the inventive compositions.

The aforementioned optional blending of a heterophasic polypropylene copolymer according to the invention with further polypropylene homopolymer matrix material (A) is preferably performed before or in combination with the addition of additives or masterbatches.

Thus, in a further embodiment a heterophasic polypropylene copolymer, prepared as described above, is blended with further polypropylene homopolymer matrix material (A). In this embodiment a heterophasic polypropylene copolymer, prepared as described above, is called the "base heterophasic polypropylene copolymer".

A polypropylene homopolymer matrix material (A) obtained after the first gas phase reactor of a process as described above is taken as blend partner, which leads to a "dilution" of the "base heterophasic polypropylene copolymer", whereby the properties of the XCS fraction can be optimized in view of amount of XCS and mechanical performance, by carefully adding specific amounts of additional polypropylene homopolymer matrix material (A).

Preferably such blends comprise 60 to 99 wt %, preferably 65 to 95 wt % and more preferably 68 to 93 wt % of "base heterophasic polypropylene copolymer" and 1.0 to 40 wt %, preferably 5 to 35 wt % and more preferably 7 to 32 wt % of additional polypropylene homopolymer matrix material (A).

For blending again conventional compounding or blending apparatus, e.g. a Banbury mixer, a 2-roll rubber mill, Buss-co-kneader or a twin screw extruder may be used. The twin screw extruder may be co-rotating or counter-rotating, preferably co-rotating.

Test Methods

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E \text{ [wt \%]}=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The Xylene Soluble Fraction at Room Temperature (XCS, Wt %):

The amount of the polymer soluble in xylene is determined at 25° C. according to ISO 16152; 5$^{th}$ edition; 2005-07-01.

Intrinsic Viscosity (IV)

The intrinsic viscosity (IV) value increases with the molecular weight of a polymer. The IV values e.g. of the XCS were measured according to ISO 1628/1 in decalin at 135° C.

DSC Analysis, Melting Temperature (T$_m$), Melting Enthalpy (H$_m$), Crystallization Temperature (T$_c$) and Crystallization Enthalpy (H$_c$):

Measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (T$_c$) and crystallization enthalpy (H$_c$) are determined from the cooling step, while melting temperature (T$_m$) and melting enthalpy (H$_m$) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 mm$^3$) between −100° C. and +150° C. with a heating rate of 2° C./min and a frequency of 1 Hz. The specimen is compress moulded according to ISO 1872-2:2007

MFR$_2$ (230° C.) is measured according to ISO 1133 (230° C., 2.16 kg load)

The melt flow rate is measured as the MFR$_2$ in accordance with ISO 1133 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

Charpy notched impact strength (NIS)

Charpy notched impact is measured according to ISO 179/1eA at +23° C. and at −20° C. using an injection moulded test specimen (80×10×4 mm$^3$) as produced according to ISO 1873-2.

OIT

The oxidation induction time (OIT) at 210° C. was determined with a TA Instrument Q20 according to ISO 11357-6. Calibration of the instrument was performed with Indium and Tin, according to ISO 11357-1. Each polymer sample (cylindrical geometry with a diameter of 5 mm and thickness of 0.5±0.05 mm) was placed in an open aluminium crucible, heated from 25° C. to 210° C. at a rate of 20° C. min$^{-1}$ in nitrogen with a gas flow rate of 50 mL min$^{-1}$, and allowed to rest for 5 min before the atmosphere was switched to oxygen, also at a flow rate of 50 mL min$^{-1}$. The samples were maintained at constant temperature, and the exothermal heat associated with oxidation was recorded. The oxidation induction time was the time interval between the initiation of oxygen flow and the onset of the oxidative reaction.

Shrinkage

The shrinkage is determined by injection moulding of the resin with an injection moulding machine into a mould having a cavity to form a plate of 150×80×2 mm$^3$ in line with ISO 1873-2. After cooling at room temperature for 96 hours, the length and the width of the plate are determined to calculate the longitudinal and the transversal shrinkage in percent.

Flexural Modulus:

The flexural modulus was determined in 3-point-bending according to ISO 178 on 80×10×4 mm$^3$ test bars injection moulded at 23° C. in line with EN ISO 1873-2.

Materials

Catalysts

The catalysts used in the polymerization process for the heterophasic polypropylene copolymer were prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Catalyst 1 Preparation for PP2 & PP3

Preparation of the Mg Alkoxy Compound

Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature. The thus obtained catalyst was used along with triethylaluminium (TEAL) as co-catalyst and di(cyclopentyl) dimethoxy silane (D-donor) as donor. The molar ratio of co-catalyst (Co) to external donor (ED) [Co/ED] and the molar ratio of co-catalyst (Co) to titanium compound (TC) [Co/TC] are indicated in table 1.

Polymerization was performed in a Borstar pilot plant, comprising a prepolymerization reactor, a loop reactor and two or three gas phase reactors. The polymerization conditions are also indicated in table 1.

Catalyst 2 Preparation for PP1

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified by pre-polymerization (VCH modification of the catalyst). 35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinylcyclohexane (VCH) was added.). The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

As external donor di(cyclopentyl) dimethoxy silane (donor D) was used.

TABLE 1

Polymerisation of heterophasic polypropylene copolymer

| | | PP3 | PP2 | PP1 |
|---|---|---|---|---|
| | | | Catalyst | |
| | | Catalyst 1 | Catalyst 1 | Catalyst 2 |
| Prepoly | | | | |
| Temperature | ° C. | 20 | 20 | 20 |
| [Co/ED] | mol/mol | 7 | 7 | 7 |
| [Co/TC] | mol/mol | 245 | 240 | 200 |
| Residence time | h | 0.34 | 0.34 | 0.34 |
| Loop | | | | |
| Temperature | ° C. | 80 | 80 | 85 |
| H2/C3 | mol/kmol | 1.2 | 1.2 | 1.4 |
| C2/C3 | mol/kmol | 0 | 0 | 0 |
| Split | wt % | 39 | 41 | 48 |
| MFR | g/10 min | 6.9 | 7.0 | 2.5 |
| XCS | wt % | 2.5 | 2.5 | 1.5 |

TABLE 1-continued

Polymerisation of heterophasic polypropylene copolymer

|  |  | PP3 | PP2 | PP1 |
|---|---|---|---|---|
|  |  | Catalyst | | |
|  |  | Catalyst 1 | Catalyst 1 | Catalyst 2 |
|  |  | GPR1 | | |
| Temperature | °C. | 80 | 80 | 85 |
| C2/C3 | mol/kmol | 0 | 0 | 0 |
| H2/C3 | mol/kmol | 15.9 | 14.7 | 14.0 |
| Split | wt % | 43 | 43 | 39 |
| MFR | g/10 min | 8.3 | 7.4 | 2.5 |
| XCS | wt % | 1.9 | 1.9 | 1 |
|  |  | GPR2 | | |
| Temperature | °C. | 70 | 70 | 75 |
| C2/C3 | mol/kmol | 524 | 417 | 380 |
| H2/C3 | mol/kmol | 29.38 | 31.7 | 550 |
| Split | wt % | 18.0 | 16.0 | 13 |
| MFR | g/10 min | 3.5 | 3.5 | 2.5 |
| XCS | wt % | 20.2 | 18.3 | 14 |
| Ethylene content | wt % | 10 | 8.7 | 3.6 |

Additives

Irganox 1010, sterically hindered phenol, has CAS no 6683-19-8

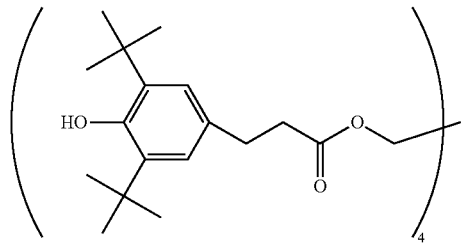

Chimassorb 944, UV stabilizer, has CAS no 71878-19-8

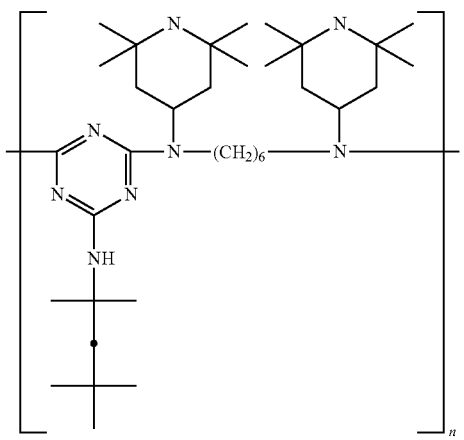

Irgafos 168 (BASF AG, Germany), phosphorus based antioxidant, has CAS no 31570-04-4

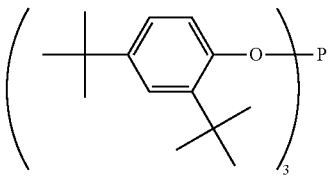

Calcium stearate (Croda Polymer Additives, Germany), acid scavenger, has CAS no 216-472-8

Hyperform HPN-20E (Milliken, USA), α-nucleating agent, Ca-salt of hexahydrophthalic acid Talc is the commercial product "HM2" manufactured by IMI-Fabi (Italy) having a median particle size d50 of 2.4 µm, a cutoff particle size d95 of 7.7 µm and a specific surface of 21 m²/g.

EXAMPLES

The polypropylene compositions were prepared by melt blending the components on a co-rotating twin screw extruder type Coperion ZSK 40 (screw diameter 40 mm, L/D ratio 38) at temperatures in the range of 170-190° C., using a high intensity mixing screw configuration with two sets of kneading blocks.

TABLE 2

Heterophasic polypropylene composition with properties

|  | Unit | Comparative Example 1 | Inventive Example 1 | Inventive Example 2 | Inventive Example 3 | Inventive Example 4 |
|---|---|---|---|---|---|---|
| Base resin |  | PP1 | PP2 | PP2 | PP2 | PP3 |
| Irganox 1010 | wt % | 0.033 | 0.4 | 0.4 | 0.4 | 0.033 |
| Irgafos 168 | wt % | 0.067 | 0.2 | 0.2 | 0.2 | 0.067 |
| Calcium stearate | wt % | 0.1 | 0.1 | 0.1 | 0.1 | 0.1 |
| Chimassorb 944 | wt % |  |  |  | 0.15 |  |
| MFR$_2$ | g/10 min |  |  | 3.22 | 3.67 | 3.6 |
| Modification |  | PVCH/HPN20E 500 ppm | no | 0.5% talc | 0.5% talc | 0.5% talc |
| C2 total | wt % | 5.38 | 9.57 | 9.57 | 9.57 | 12.34 |
| EEE | mol % | 2.49 | 6.58 | 6.58 | 6.58 | 9.29 |
| EEP | mol % | 2.72 | 5.17 | 5.17 | 5.17 | 6.29 |
| PEP | mol % | 2.06 | 2.06 | 2.06 | 2.06 | 2.35 |
| I(E) total | % | 39.54 | 14.92 | 14.92 | 14.92 | 13.11 |

TABLE 2-continued

Heterophasic polypropylene composition with properties

| | Unit | Comparative Example 1 | Inventive Example 1 | Inventive Example 2 | Inventive Example 3 | Inventive Example 4 |
|---|---|---|---|---|---|---|
| C2 XCS | wt % | 29.91 | 41.34 | 41.34 | 41.34 | 46.53 |
| EEE | mol % | 10.05 | 18.5 | 18.5 | 18.5 | 24.51 |
| EEP | mol % | 16.1 | 22.37 | 22.37 | 22.37 | 22.71 |
| PEP | mol % | 12.62 | 10.83 | 10.83 | 10.83 | 9.54 |
| I(E) XCS | % | 48.26 | 20.95 | 20.95 | 20.95 | 16.81 |
| C2 XI | wt % | 1.27 | 4 | 4 | 4 | 4.56 |
| EEE | mol % | 1.14 | 4.02 | 4.02 | 4.02 | 5.12 |
| EEP | mol % | 0.37 | 1.18 | 1.18 | 1.18 | 1.36 |
| PEP | mol % | 0.41 | 0.32 | 0.32 | 0.32 | 0.54 |
| I(E) XI | % | 27.15 | 5.80 | 5.80 | 5.80 | 7.69 |
| Tc-PE | °C. | n.d. | 95 | 95 | 95 | 93 |
| Tc-PP | °C. | 129 | 122 | 123 | 123 | 123 |
| Tm-PP | °C. | 168 | 165 | 166 | 166 | 165 |
| Tm-PE | °C. | n.d. | 119 | 119 | 119 | 117 |
| Hm-PP | kJ/mg | 104 | 74 | 74 | 74 | 78 |
| Crystalline PP | wt % | 50% | 36% | 36% | 36% | 38% |
| Hm-PE | kJ/mg | n.d. | 0.4 | 0.4 | 0.4 | 0.28 |
| Crystalline PE | wt % | | 0.14 | 0.14 | 0.14 | 0.10 |
| XCS | wt % | 15 | 18 | 18 | 18 | 20 |
| IV-XCS | dg/l | 1.7 | 4 | 4 | 4 | 5.3 |
| OIT-210° C. | min | 6 | 35 | 42 | 48 | 8 |
| NIS@−20° C. | kJ/m² | 1.5 | 5 | 5 | 5 | 7.21 |
| Flex modulus | MPa | 1400 | 1200 | 1200 | 1200 | 1121 |
| SH-flow | % | 1.54 | 1.4 | 1.32 | 1.32 | 1.29 |

SH-flow means shrinkage in flow direction and SH-Cross means shrinkage in cross direction.

NIS is notched impact strength.

C2 XCS is ethylene content of the XCS

Hm-PE is the melt enthalpy of polyethylene and Hm-PP is the melt enthalpy of polypropylene. Crystalline PP and crystalline PE in the composition are calculated according to formula $$\frac{Hm}{H0} \times 100\%$$

Hm is the melting enthalpy of PP fraction and PE fraction in the composition. H0 is the enthalpy of 100% crystalline sample, for PP it is 207 kJ/mg and PE is 288 kJ/mg (Wang, et al. J. Appl. Polym. Sci., 2009, 111, 194-202).

The inventive examples give very good stiffness and impact strength, while maintaining the shrinkage at low level. Even though the comparative example has low IV propylene rich rubber, the shrinkage is still too high. Moreover the talc gives higher OIT as shown by comparing inventive example 1 and 2. Having a higher intrinsic viscosity of the xylene solubles (IV-XCS) increase the NIS significantly, which is a requirement for the application of buffer tubes.

Tubes with diameter of 12 mm and wall thickness of 1.8 mm were extruded from inventive example 2 and comparative example 1 on a Battenfeld "PRO R1349" extrusion line. The screw speed and throughput were fixed at 32 rpm and 25 kg/h. The barrel temperature was set between 190 to 230° C. from zone 1 to zone 4. The melt temperature was set at 230° C. The pressure of vacuum Spray-tank is fixed at 0.3 bar and water temperature was 20° C. 5 samples of ~300 mm were cut and the lengths were measured after 2 h and after 24 h [relative humidity 50% and temperature 23° C.]. The average shrinkage of length was determined in %. The outer diameter was measured and the shrinkage was measured immediately and after 24 h.

| | Unit | Inventive example 2 | Comparative Example 1 |
|---|---|---|---|
| shrinkage in length after 2 hr | % | 0.14 | 0.13 |
| shrinkage in length after 24 hr | % | 0.18% | 0.21% |
| diameter calibration sleeve | mm | 12.5 | 12.5 |
| Outer diameter (OD) after cutting | mm | 12 | 11.9 |
| OD after 24 hr | mm | 11.9 | 11.8 |
| Shrinkage after cutting | % | 4 | 4.8 |
| shrinkage after 24 hr | % | 4.8 | 5.6 |

The shrinkage of the tubes are calculated based on:

$$\text{shrinkage \%} = 100 \times \frac{l - l_0}{l_0}$$

$l_0$ is the original size of the sample, e.g. the length of the tube cut directly after production and the diameter calibration sleeve $l$ is the size of the sample after aging The results show that the inventive example has lower shrinkage than the comparative examples. Especially after storage, which is crucial for the target application, e.g. buffer tube.

The invention claimed is:
1. An extruded tube comprising a heterophasic polypropylene composition comprising:
   (a) a heterophasic polypropylene copolymer, and
   (b) an antioxidant comprising a sterically hindered phenol,
   wherein the heterophasic polypropylene copolymer fulfills the following features:
      (i) the relative amount of crystalline polypropylene in the heterophasic polypropylene copolymer is above 20 wt % and less than 45 wt %,
      (ii) the relative amount of xylene cold solubles (XCS) fraction, determined at 25° C. according to ISO 16152, in said heterophasic polypropylene copolymer is at least 10 wt %,

(iii) the relative content of isolated ethylene sequences (I(E)) of the XCS fulfils the equation:

$$I(E)<78-1.97\times C+0.015\times (C)^2 \qquad (I)$$

wherein C is the comonomer content [wt %] of the XCS fraction and wherein the I(E) content is defined by equation:

$$I(E) = \frac{fPEP}{(fEEE + fPEE + fPEP)} \times 100 \qquad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

2. The extruded tube according to claim 1 wherein the heterophasic polypropylene copolymer has an ethylene content of the XCS, determined at 25° C. according to ISO 16152, of 32 to 70 wt %.

3. The extruded tube according to claim 1 wherein the heterophasic polypropylene copolymer has a total comonomer content defined as the sum of content of ethylene and α-olefins with 4-10 carbon atoms in the range of 7 to 26 wt %.

4. The extruded tube according to claim 1 wherein the heterophasic polypropylene copolymer fulfills the following features:
(iv) 90-70 wt % of xylene cold insoluble (XCI) fraction having an ethylene content in the range of 1.0 to 10.0 wt % and a relative content of isolated ethylene sequences (I(E)) of less than 20%, and
(v) 30-10 wt % of xylene cold soluble (XCS) from fraction, determined at 25° C. according to ISO 16152, having an ethylene content in the range of 30 to 60 wt % and a relative content of isolated ethylene sequences (I(E)) of less than 45%.

5. The extruded tube according to claim 1 wherein the heterophasic polypropylene copolymer fulfills the following features:
(iv) having a crystalline polypropylene content with a melting point (Tm) from DSC analysis according ISO 11357 in the range of 160 to 170° C., and
(v) optionally a crystalline polyethylene content with a melting point from DSC analysis according ISO 11357 in the range of 105 to 130° C.

6. The extruded tube according to claim 1 wherein the amount of heterophasic polypropylene copolymer is in an amount of 50 to 99 wt % of the heterophasic polypropylene composition.

7. The extruded tube according to claim 1 wherein the heterophasic polypropylene composition has a MFR$_2$ of 1.0 to 10.0 g/10 min, measured in accordance with ISO 1133 (230° C., 2.16 kg load).

8. The extruded tube according to claim 1 wherein the heterophasic polypropylene composition has an amount of 0.1 to 3.0 wt % of reinforcing filler.

9. The extruded tube according to claim 1 wherein the heterophasic polypropylene copolymer has a detectable crystalline polyethylene content which fulfils the equation Hm-PE/Hm-PP<5.

10. The extruded tube according to claim 1 wherein the heterophasic polypropylene copolymer is further characterized by an intrinsic viscosity, measured according to ISO 1628/1 in decalin at 135° C., of the XCS fraction, determined at 25° C. according to ISO 16152, in the range of 2 to 7.0 dl/g.

11. The extruded tube according to claim 1 wherein heterophasic polypropylene composition has a further stabilizer comprising at least one amine group.

12. The extruded tube according to claim 1 wherein the heterophasic polypropylene composition comprises one or more of a metal deactivator or UV stabilizer.

13. A buffertube comprising an extruded tube comprising a heterophasic polypropylene composition comprising:
(a) a heterophasic polypropylene copolymer, and
(b) an antioxidant comprising a sterically hindered phenol,
wherein the heterophasic polypropylene copolymer fulfills the following features:
(i) the relative amount of crystalline polypropylene in the heterophasic polypropylene copolymer is above 20 wt % and less than 45 wt %,
(ii) the relative amount of xylene cold solubles (XCS) fraction in said heterophasic polypropylene copolymer is at least 10 wt %,
(iii) the relative content of isolated ethylene sequences (I(E)) of the XCS fulfils the equation:

$$I(E)<78-1.97\times C+0.015\times (C)^2 \qquad (I)$$

wherein C is the comonomer content [wt %] of the XCS fraction and
wherein the I(E) content is defined by equation:

$$I(E) = \frac{fPEP}{(fEEE + fPEE + fPEP)} \times 100 \qquad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

14. An optical fiber cable comprising at least one buffertube, wherein the buffertube comprises an extruded tube comprising a heterophasic polypropylene composition comprising:
(a) a heterophasic polypropylene copolymer, and
(b) an antioxidant comprising a sterically hindered phenol,
wherein the heterophasic polypropylene copolymer fulfills the following features:
(i) the relative amount of crystalline polypropylene in the heterophasic polypropylene copolymer is above 20 wt % and less than 45 wt %, (ii) the relative amount of xylene cold solubles (XCS) fraction, determined at 25° C. according to ISO 16152, in said heterophasic polypropylene copolymer is at least 10 wt %,
(iii) the relative content of isolated ethylene sequences (I(E)) of the XCS fulfills the equation:

$$I(E) < 78 - 1.97 \times C + 0.015 \times (C)^2 \qquad (I)$$

wherein C is the comonomer content [wt %] of the XCS fraction and
wherein the I(E) content is defined by equation:

$$I(E) = \frac{fPEP}{(fEEE + fPEE + fPEP)} \times 100 \qquad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations being based on a statistical triad analysis of $^{13}$C-NMR data.

15. The extruded tube according to claim 8, wherein the reinforcing filler comprises talc.

\* \* \* \* \*